United States Patent
Kim et al.

(10) Patent No.: US 12,084,605 B2
(45) Date of Patent: Sep. 10, 2024

(54) ADHESIVE FILM, OPTICAL MEMBER INCLUDING THE SAME AND OPTICAL DISPLAY INCLUDING THE SAME

(71) Applicant: SAMSUNG SDI CO., LTD., Yongin-si (KR)

(72) Inventors: Ji Ho Kim, Suwon-si (KR); Ji Won Kang, Suwon-si (KR); Il Jin Kim, Suwon-si (KR); Sung Hyun Mun, Suwon-si (KR); Kyoung Gon Park, Suwon-si (KR); Gwang Hwan Lee, Suwon-si (KR); Jin Young Lee, Suwon-si (KR); Jae Hyun Han, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 49 days.

(21) Appl. No.: 16/596,465

(22) Filed: Oct. 8, 2019

(65) Prior Publication Data
US 2020/0115594 A1 Apr. 16, 2020

(30) Foreign Application Priority Data
Oct. 10, 2018 (KR) .................. 10-2018-0120785

(51) Int. Cl.
*C09J 11/08* (2006.01)
*C09J 7/38* (2018.01)
*G02B 1/08* (2006.01)
*H10K 59/00* (2023.01)

(52) U.S. Cl.
CPC .............. *C09J 7/385* (2018.01); *C09J 11/08* (2013.01); *C09J 2203/318* (2013.01); *C09J 2203/326* (2013.01); *C09J 2301/412* (2020.08); *C09J 2301/414* (2020.08); *C09J 2433/00* (2013.01); *G02B 1/08* (2013.01); *H10K 59/00* (2023.02); *Y10T 428/2891* (2015.01)

(58) Field of Classification Search
None
See application file for complete search history.

(56) References Cited

U.S. PATENT DOCUMENTS

| | | | | |
|---|---|---|---|---|
| 2016/0122600 | A1* | 5/2016 | Moon | ............. C09J 7/22 428/354 |
| 2017/0121564 | A1 | 5/2017 | Cho et al. | |
| 2017/0240782 | A1* | 8/2017 | Suwa | ............. C09J 133/066 |
| 2017/0247579 | A1* | 8/2017 | Kwak | ............. C08F 220/18 |
| 2018/0237660 | A1* | 8/2018 | Irie | ............. B32B 7/12 |

FOREIGN PATENT DOCUMENTS

| | | |
|---|---|---|
| CN | 103249791 A | 8/2013 |
| CN | 106349961 A | 1/2017 |
| CN | 107123370 A | 9/2017 |
| CN | 107418481 A | 12/2017 |
| KR | 10-2007-0055363 A | 5/2007 |
| KR | 10-2017-0070753 A | 6/2017 |
| TW | 201335307 A1 | 9/2013 |
| TW | 201704426 A | 2/2017 |
| WO | WO 2015/080346 A1 | 6/2015 |

OTHER PUBLICATIONS

Taiwan Office Action for corresponding Taiwan Application No. 108136497, Taiwan Office Action mailed May 7, 2020 (8 pgs.).
Chinese Office Action in corresponding Chinese Patent Application No. 201910954413.6, Chinese Office Action mailed Mar. 26, 2021 (6 pgs.).
Korean Office Action in corresponding Korean Patent Application No. 10-2018-0120785, Korean Office Action mailed Apr. 24, 2021 (4 pgs.).

* cited by examiner

*Primary Examiner* — Anish P Desai
(74) *Attorney, Agent, or Firm* — Lewis Roca Rothgerber Christie LLP

(57) ABSTRACT

An adhesive film formed of an adhesive composition including a (meth)acrylic copolymer including an alkylene glycol group and a cyclic functional group while satisfying Equation 3 and Equation 4 herein, an optical member including the same, and an optical display including the same, are provided.

15 Claims, 4 Drawing Sheets

FIG. 1
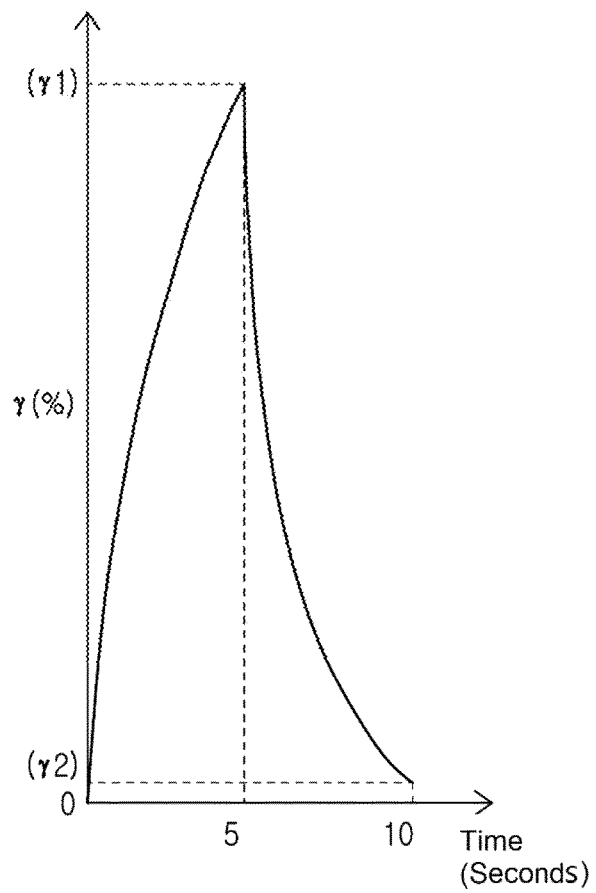
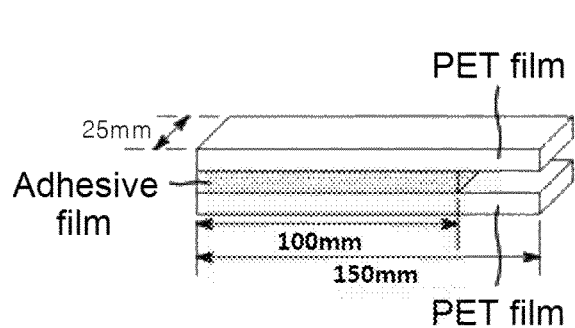
FIG. 2A
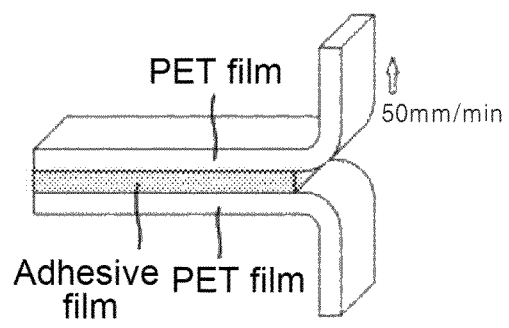
FIG. 2B

ADHESIVE FILM, OPTICAL MEMBER INCLUDING THE SAME AND OPTICAL DISPLAY INCLUDING THE SAME

CROSS-REFERENCE TO RELATED APPLICATION

This application claims priority to and the benefit of Korean Patent Application No. 10-2018-0120785, filed on Oct. 10, 2018 in the Korean Intellectual Property Office, the entire disclosure of which is incorporated herein by reference.

BACKGROUND

1. Field

Aspects of embodiments of the present invention relate to an adhesive film, an optical member including the same, and an optical display including the same.

2. Description of the Related Art

An optical display includes display elements including a window film, a conductive film, an organic light emitting diode, and the like. In the optical display, various display elements are attached to each other via optically clear adhesives (OCAs). Recently, a flexible optical display has been developed. To this end, an adhesive film is required to have good foldability while securing good reliability without delamination or bubble generation under temperature variation or thermal impact conditions of high temperature, room temperature, and low temperature. The adhesive film is also required to have cyclic foldability and peel strength at low temperature.

The background technique of the present invention is disclosed in Korean Patent Laid-open Publication No. 10-2007-0055363.

SUMMARY

According to an aspect of embodiments of the present invention, an adhesive film has good foldability and good peel strength with respect to an adherend at low temperature.

According to another aspect of embodiments of the present invention, an adhesive film has good foldability and good peel strength with respect to an adherend in environmental variation from low temperature to high temperature/humidity conditions.

According to another aspect of embodiments of the present invention, an adhesive film has good optical transparency.

According to one or more embodiments of the present invention, an adhesive film is formed of an adhesive composition including a (meth)acrylic copolymer including an alkylene glycol group and a cyclic functional group. The adhesive film satisfies the following Equations 3 and 4:

$$\gamma1 \text{ after 10 cycles of foldability testing} = \text{about } 2.50\% \text{ to about } 5.00\%, \quad \text{[Equation 3]}$$

$$|\gamma2-\gamma1|_{[10]}/|\gamma2-\gamma1|_{[1000]} \times 100 = \text{about } 80\% \text{ to about } 120\%, \quad \text{[Equation 4]}$$

where $|\gamma2-\gamma1|_{[10]}$ is an absolute value (unit: %) of a difference between γ2 and γ1 after 10 cycles of foldability testing, and $|\gamma2-\gamma1|_{[1000]}$ is an absolute value (unit: %) of a difference between γ2 and γ1 after 1,000 cycles of foldability testing, wherein each cycle of foldability testing refers to an operation of applying a force consisting of a shear stress of 2,000 Pa and a normal force of 1 N to a cylindrical specimen at −20° C. in a clockwise direction for 5 seconds and completely removing the force from the cylindrical specimen for 5 seconds using an upper jig of a dynamic viscoelasticity instrument, with upper and lower surfaces of the cylindrical specimen secured to the upper and lower jigs of the dynamic viscoelasticity instrument, respectively, in which the cylindrical specimen is prepared by stacking the adhesive film in plural layers and punching a stack of the adhesive films to have a circular cross-section having a diameter of 8 mm; γ1 refers to a value (unit: %) calculated by the following Equation 1 upon application of the force to the specimen for 5 seconds; and γ2 refers to a value (unit: %) calculated by the following Equation 2 after 1 cycle of foldability testing:

$$\gamma1 = A/B \times 100, \quad \text{[Equation 1]}$$

where A is a movement distance (unit: μm) of one point on the specimen upon application of the force to the specimen for 5 seconds, and B is an initial thickness of the specimen (unit: μm), $$\gamma2 = C/B \times 100, \quad \text{[Equation 2]}$$

where C is a movement distance (unit: μm) of one point on the specimen after 1 cycle of foldability testing, and B is the initial thickness of the specimen (unit: μm).

In an embodiment, the (meth)acrylic copolymer including an alkylene glycol group and a cyclic functional group may include a copolymer of a monomer mixture including a hydroxyl group-containing (meth)acrylate, an alkyl group-containing (meth)acrylate, an alkylene glycol group-containing (meth)acrylate, and a cyclic (meth)acrylate having a glass transition temperature of about 80° C. or less in a homopolymer phase.

In an embodiment, the cyclic (meth)acrylate having a glass transition temperature of about 80° C. or less in a homopolymer phase may have a glass transition temperature of about −20° C. to about 80° C. in a homopolymer phase.

In an embodiment, the cyclic (meth)acrylate having a glass transition temperature of about 80° C. or less in a homopolymer phase may include at least one selected from the group consisting of tetrahydrofurfuryl (meth)acrylate, cyclohexyl (meth)acrylate, and 3,3,5-trimethylcyclohexyl (meth)acrylate.

In an embodiment, the cyclic (meth)acrylate having a glass transition temperature of about 80° C. or less in a homopolymer phase may be present in an amount of about 5 wt % to about 40 wt % in the monomer mixture.

In an embodiment, the alkylene glycol group-containing (meth)acrylate may include an ethylene oxide group (—CH$_2$CH$_2$O—) or a propylene oxide group (—CH$_2$CH$_2$CH$_2$O—).

In an embodiment, the alkylene glycol group-containing (meth)acrylate may include at least one selected from the group consisting of ethylhexyldiethylene glycol (meth)acrylate, ethylhexyltriethylene glycol (meth)acrylate, and octyldiethylene glycol (meth)acrylate.

In an embodiment, the monomer mixture may include about 10 wt % to about 40 wt % of the hydroxyl group-containing (meth)acrylate, about 10 wt % to about 75 wt % of the alkyl group-containing (meth)acrylate, about 10 wt % to about 60 wt % of the alkylene glycol group-containing (meth)acrylate, and about 5 wt % to about 40 wt % of the cyclic (meth)acrylate having a glass transition temperature of about 80° C. or less in a homopolymer phase.

In an embodiment, the adhesive film may have a peel strength of about 700 gf/in or more at 25° C.

In an embodiment, the adhesive film may have a modulus of about 100 kPa or less at −20° C.

In an embodiment, the adhesive film may have a recovery rate of about 40% or more after 1 cycle of foldability testing, as defined by the following Equation 5:

$$\text{Recovery rate}=(1-(\gamma 2/\gamma 1))\times 100, \quad \text{[Equation 5]}$$

where γ1 is a value defined by Equation 1, and γ2 is a value defined by Equation 2.

In an embodiment, the adhesive film may have a recovery rate of about 20% or more after 1,000 cycles of foldability testing, as defined by Equation 5.

In an embodiment, the adhesive film may further include organic nanoparticles.

In an embodiment, the organic nanoparticles may include core-shell nanoparticles.

In an embodiment, the organic nanoparticles may satisfy the following Equation 6:

$$Tg(c)<Tg(s), \quad \text{[Equation 6]}$$

where Tg(c) is a glass transition temperature of the core (unit: ° C.), and Tg(s) is a glass transition temperature of the shell (unit: ° C.).

In an embodiment, the adhesive composition may include about 10 wt % to about 40 wt % of a hydroxyl group-containing (meth)acrylate, about 10 wt % to about 75 wt % of an alkyl group-containing (meth)acrylate, about 10 wt % to about 60 wt % of an alkylene glycol group-containing (meth)acrylate, about 5 wt % to about 40 wt % of a cyclic (meth)acrylate having a glass transition temperature of about 80° C. or less in a homopolymer phase, and about 0.1 wt % to about 20 wt % of the organic nanoparticles, based on a total amount of a monomer mixture for the (meth)acrylic copolymer including an alkylene glycol group and a cyclic functional group and the organic nanoparticles.

According to one or more embodiments of the present invention, an optical member may include an optical film and the adhesive film according to an embodiment of the present invention on at least one surface of the optical film.

According to one or more embodiments of the present invention, an optical display may include the adhesive film according to an embodiment of the present invention.

According to an aspect of embodiments of the present invention, an adhesive film having good foldability and good peel strength with respect to an adherend at low temperature is provided.

According to another aspect of embodiments of the present invention, an adhesive film having good foldability and good peel strength with respect to an adherend in environmental variation from low temperature to high temperature/humidity conditions is provided.

According to another aspect of embodiments of the present invention, an adhesive film having good optical transparency is provided.

BRIEF DESCRIPTION OF THE DRAWINGS

FIG. 1 is a graph depicting γ1 and γ2 according to the present invention.

FIGS. 2A and 2B are a plan view and a cross-sectional view, respectively, of a specimen for measuring T-peel strength of an adhesive film according to the present invention.

DETAILED DESCRIPTION

Figure 3:
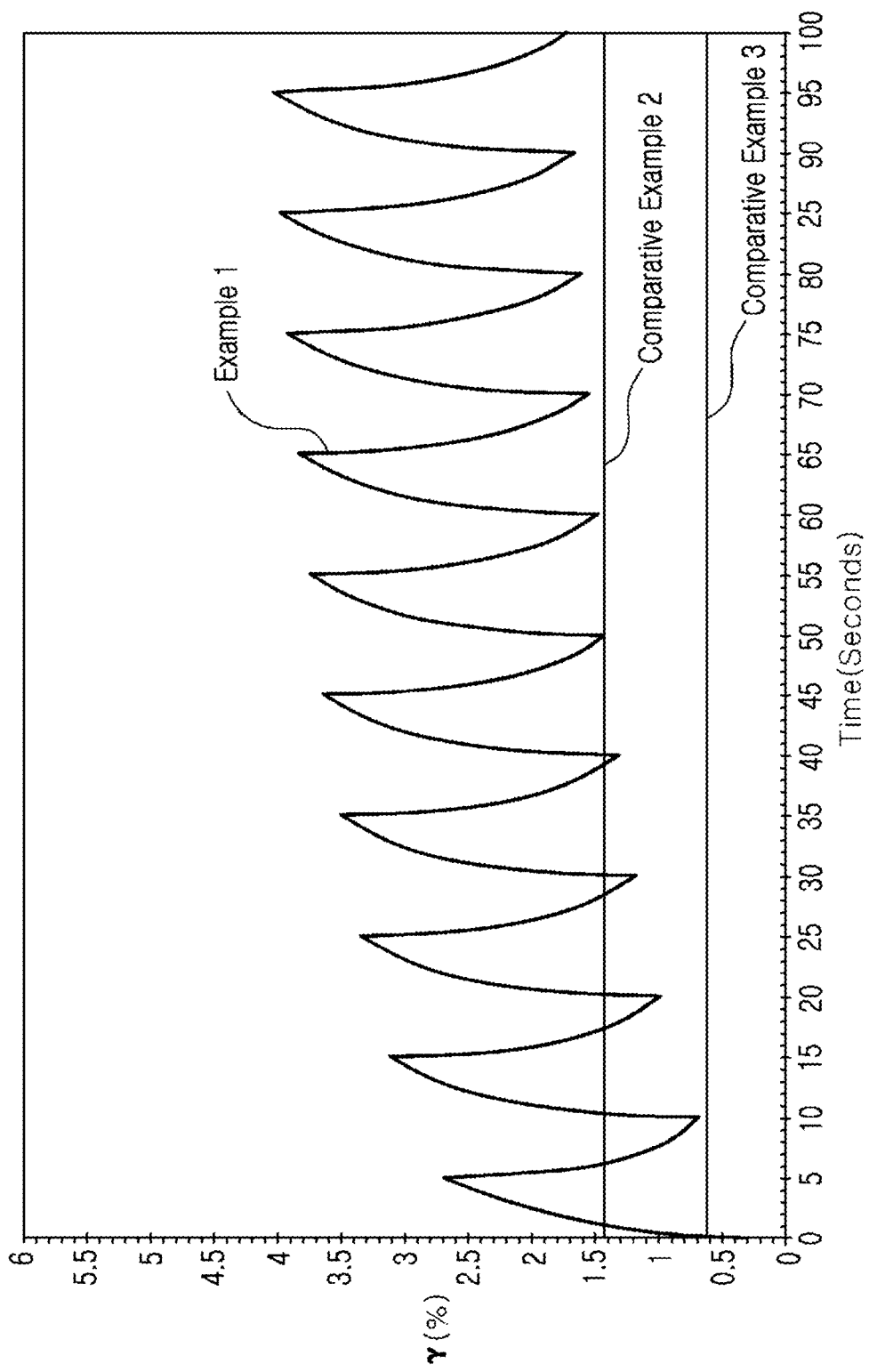
FIG. 3 is a graph depicting measurement results of adhesive films of an Example according to the present invention and some Comparative Examples after 10 cycles of foldability testing.

Some embodiments of the present invention will be described in further detail with reference to the accompanying drawings such that the present invention can be easily implemented by those skilled in the art. It is to be understood that the present invention may be embodied in different ways and is not limited to the following embodiments.

Herein, the term "(meth)acryl" refers to acryl and/or methacryl.

Herein, the term "copolymer" may include an oligomer, a polymer, or a resin.

Herein, the term "average particle diameter" of organic nanoparticles refers to a particle diameter thereof, as measured in a water-based or organic solvent using a Zetasizer nano-ZS (Malvern Co., Ltd.) and represented by a Z-average value, and observed by SEM/TEM.

Herein, the term "modulus" means storage modulus (G').

Herein, γ1 and γ2 are used to define good foldability of an adhesive film at low temperature and good foldability thereof in temperature variation through repeated folding of the adhesive film plural times between high temperature and low temperature. A method for measuring γ1 and γ2 will be described hereinafter.

For measurement of γ1 and γ2, a cylindrical specimen having upper and lower surfaces is prepared by stacking a plurality of adhesive films having a certain thickness and punching a stack of the adhesive films to have a circular cross-section having a diameter of 8 mm, and is mounted on a dynamic viscoelasticity measurement instrument such that the upper and lower surfaces of the cylindrical specimen are secured to upper and lower jigs of the instrument, respectively. Then, a cycle of foldability testing is performed using the upper jig secured to the upper surface of the cylindrical specimen with the lower jig secured to the lower surface of the cylindrical specimen by applying a force consisting of a shear stress of 2,000 Pa and a normal force of 1 N to a cylindrical specimen at −20° C. in the clockwise direction for 5 seconds and completely removing the force from the cylindrical specimen for 5 seconds. Results obtained from the dynamic viscoelasticity measurement instrument after one cycle are shown in FIG. 1.

Referring to FIG. 1, γ1 (unit: %) calculated by the following Equation 1 is obtained upon application of the force to the specimen for 5 seconds (indicated by a point corresponding to 5 seconds in FIG. 1):

$$\gamma 1=A/B\times 100, \quad \text{[Equation 1]}$$

where A is a movement distance (unit: μm) of one point on the specimen upon application of the force to the specimen for 5 seconds, and B is an initial thickness of the specimen (unit: μm).

Referring again to FIG. 1, γ2 (unit: %) calculated by the following Equation 2 is obtained upon complete removal of the force for 5 seconds after application of the force to the specimen for 5 seconds (indicated by a point corresponding to 10 seconds in FIG. 1):

$$\gamma 2 = C/B \times 100, \quad \text{[Equation 2]}$$

where C is a movement distance (unit: μm) of one point on the specimen after 1 cycle of foldability testing, and B is an initial thickness of the specimen (unit: μm).

In measurement of γ1 and γ2, an initial thickness of the specimen is not limited to a particular value. For example, the specimen may have an initial thickness of 100 μm to 800 μm, preferably 400 μm, without being limited thereto. The viscoelasticity instrument may be a rheometer (MCR-501, Anton Paar Co., Ltd.), without being limited thereto.

In measurement of γ1 and γ2, the movement distance may be a value measured on the circumference of the cylindrical specimen.

Herein, the term "glass transition temperature (Tg) in a homopolymer phase" may mean a glass transition temperature measured with respect to a homopolymer of a target monomer using a DSC Discovery (TA Instrument Inc.). The homopolymer of the target monomer is heated to 180° C. at a rate of 20° C./min, slowly cooled to −100° C. at the same rate, and heated to 100° C. at a rate of 10° C./min in order to obtain an endothermic transition curve. Then, an inflection point of the endothermic transition curve may be determined as the glass transition temperature.

Herein, an adhesive film according to one or more embodiments of the present invention will be described.

The adhesive film according to one or more embodiments of the present invention (herein, "adhesive film") may satisfy the following Equations 3 and 4:

$$\gamma 1 \text{ after 10 cycles of foldability testing} = \text{about } 2.50\% \text{ to about } 5.00\%, \quad \text{[Equation 3]}$$

$$|\gamma 2 - \gamma 1|_{[10]} / |\gamma 2 - \gamma 1|_{[1000]} \times 100 = \text{about } 80\% \text{ to about } 120\%, \quad \text{[Equation 4]}$$

where $|\gamma 2-\gamma 1|_{[10]}$ is an absolute value (unit: %) of a difference between γ2 and γ1 after 10 cycles of foldability testing, and $|\gamma 2-\gamma 1|_{[100]}$ is an absolute value (unit: %) of a difference between γ2 and γ1 after 1,000 cycles of foldability testing.

Equation 3 refers to a γ1 value at the $10^{th}$ cycle upon performing 10 cycles of foldability testing on the specimen formed of the adhesive film. Equation 3 evaluates whether the adhesive film is efficiently folded in a pressed state upon folding of the adhesive film at low temperature. The adhesive film formed of an adhesive composition including a (meth)acrylic copolymer having an alkylene glycol group and a cyclic functional group and satisfying Equation 3 allows stable folding at low temperature and can exhibit good foldability in temperature variation through repeated folding of the adhesive film plural times between high temperature and low temperature. In an embodiment, γ1 is about 2.50% to about 4.50%, as measured after 10 cycles of foldability testing.

Equation 4 refers to a ratio of an absolute value of a difference between γ2 and γ1 measured on the specimen of the adhesive film after 10 cycles of foldability testing to an absolute value of a difference between γ2 and γ1 measured on the specimen of the adhesive film after 1,000 cycles of foldability testing. Equation 4 evaluates whether the adhesive film can be folded after folding the adhesive film at low temperature, that is, whether the adhesive film allows repeated folding even at low temperature. The adhesive film formed of the adhesive composition including the (meth) acrylic copolymer having an alkylene glycol group and a cyclic functional group and satisfying Equation 4 allows stable folding at low temperature and can exhibit good foldability in temperature variation through repeated folding of the adhesive film plural times between high temperature and low temperature. In an embodiment, the value of Equation 4 may be in a range from about 80% to about 110%.

The adhesive film may be formed of the adhesive composition including the (meth)acrylic copolymer having an alkylene glycol group and a cyclic functional group, in which the (meth)acrylic copolymer may be formed of a monomer mixture including a hydroxyl group-containing (meth)acrylate, an alkyl group-containing (meth)acrylate, an alkylene glycol group-containing (meth)acrylate, and a cyclic (meth)acrylate having a glass transition temperature of about 80° C. or less in a homopolymer phase. The hydroxyl group-containing (meth)acrylate, the alkyl group-containing (meth)acrylate, the alkylene glycol group-containing (meth)acrylate, and the cyclic (meth)acrylate having a glass transition temperature of about 80° C. or less in a homopolymer phase are different from one another. As used herein, the "cyclic (meth)acrylate" may be derived from a cyclic (meth)acrylate having a glass transition temperature of about 80° C. or less in a homopolymer phase. The "cyclic (meth)acrylate" may include a tetrahydrofurfuryl group, a cyclohexyl group, and a trimethylcyclohexyl group including 3,3,5-trimethylcyclohexyl (meth)acrylate, without being limited thereto.

In an embodiment, the (meth)acrylic copolymer having an alkylene glycol group and a cyclic functional group may have a glass transition temperature of about −100° C. to about 10° C., and, in an embodiment, about −70° C. to about 0° C. Within this range, the adhesive film formed of the adhesive composition can exhibit good adhesion and reliability over a broad temperature range. In an embodiment, the (meth)acrylic copolymer having an alkylene glycol group and a cyclic functional group may have an index of refraction of about 1.35 to about 1.70, and, in an embodiment, about 1.40 to about 1.60. Within this range, the adhesive film formed of the adhesive composition can maintain optical transparency when stacked on other optical films.

The hydroxyl group-containing (meth)acrylate can provide adhesive strength to the adhesive film. The hydroxyl group-containing (meth)acrylate may be a $C_1$ to $C_{10}$ (meth) acrylate containing at least one hydroxyl group. For example, the hydroxyl group-containing (meth)acrylate may include at least one selected from the group of 2-hydroxybutyl (meth)acrylate, 4-hydroxybutyl (meth)acrylate, 2-hydroxyethyl (meth)acrylate, 2-hydroxypropyl (meth)acrylate, 3-hydroxypropyl (meth)acrylate, and 6-hydroxyhexyl (meth)acrylate, without being limited thereto.

In an embodiment, the hydroxyl group-containing (meth) acrylate may have a glass transition temperature of about 0° C. to about −70° C., and, in an embodiment, about −10° C. to about −60° C., and, in an embodiment, about −10° C. to about −50° C., in the homopolymer phase. Within this range, the adhesive composition can improve peel strength and flexural reliability of the adhesive film. In an embodiment, the hydroxyl group-containing (meth)acrylate may be present in an amount of about 10 wt % to about 40 wt %, for example, about 10 wt % to about 30 wt %, or about 10 wt % to about 20 wt %, in the monomer mixture. Within this content range, the adhesive composition can further improve adhesive strength and durability of the adhesive film.

The alkyl group-containing (meth)acrylate can form a matrix of the adhesive film. In an embodiment, the alkyl group-containing (meth)acrylate may be a non-alkylene glycol-based (meth)acrylate not containing an alkylene glycol group. The alkyl group-containing (meth)acrylate may be an unsubstituted linear or branched $C_1$ to $C_{10}$ alkyl group-containing (meth)acrylate. For example, the alkyl group-containing (meth)acrylate may include at least one selected from the group of 2-ethylhexyl (meth)acrylate, n-butyl (meth)acrylate, iso-octyl (meth)acrylate, propyl (meth)acrylate, t-butyl (meth)acrylate, iso-butyl (meth)acrylate, pentyl (meth)acrylate, hexyl (meth)acrylate, heptyl (meth)acrylate, octyl (meth)acrylate, nonyl (meth)acrylate, and decyl (meth)acrylate, and, in an embodiment, at least one selected from the group of 2-ethylhexyl (meth)acrylate, n-butyl (meth)acrylate, and iso-octyl (meth)acrylate, more preferably 2-ethylhexyl (meth)acrylate.

In an embodiment, the alkyl group-containing (meth) acrylate may have a glass transition temperature of about −20° C. to about −80° C., and, in an embodiment, about −40° C. to about −80° C. Within this range, the adhesive film can exhibit good flexural reliability at low temperature and under high temperature/humidity conditions. In an embodiment, the alkyl group-containing (meth)acrylate may be present in an amount of about 10 wt % to about 75 wt %, and, in an embodiment, about 10 wt % to about 70 wt %, and, in an embodiment, about 15 wt % to about 60 wt %, in the monomer mixture. Within this range, the adhesive film can exhibit good flexural reliability at low temperature and under high temperature/humidity conditions. For example, the alkyl group-containing (meth)acrylate may be present in an amount of about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, or 75 wt %.

The alkylene glycol group-containing (meth)acrylate containing the alkylene glycol group can secure foldability at low temperature despite reduction in radius of curvature of the adhesive film. Herein, the "alkylene glycol group" means a $C_2$ to $C_4$ alkylene-O-group.

In an embodiment, the alkylene glycol group-containing (meth)acrylate may have a glass transition temperature of about −55° C. to about −90° C., and, in an embodiment, about −60° C. to about −90° C., and, in an embodiment, about −60° C. to about −75° C., in the homopolymer phase. Within this range, the adhesive composition can reduce modulus of the adhesive film at low temperature while securing foldability of the adhesive film at low temperature. In an embodiment, the alkylene glycol group-containing (meth)acrylate may include a monofunctional acrylate having an ethylene oxide group (—CH$_2$CH$_2$O—) or a propylene oxide group (—CH$_2$CH$_2$CH$_2$O—), and, in an embodiment, a monofunctional acrylate having an ethylene oxide group.

In an embodiment, the alkylene glycol group-containing (meth)acrylate may include at least one selected from the group of, for example, methoxy polyethylene glycol (meth) acrylate containing about 6 moles to about 13 moles of ethylene glycol, ethylhexylpolyethylene glycol (meth)acrylate containing about 2 moles to about 10 moles of ethylene glycol, and octylpolyethylene glycol (meth)acrylate. In an embodiment, the alkylene glycol group-containing (meth) acrylate includes at least one selected from the group of ethylhexyldiethylene glycol (meth)acrylate, ethylhexyltriethylene glycol (meth)acrylate, and octyldiethylene glycol (meth)acrylate.

In an embodiment, the alkylene glycol group-containing (meth)acrylate may be present in an amount of about 10 wt % to about 60 wt %, and, in an embodiment, about 20 wt % to about 60 wt %, and, in an embodiment, about 20 wt % to about 50 wt %, in the monomer mixture. Within this range, the adhesive film can have good foldability upon repeated folding at low temperature. For example, the alkylene glycol group-containing (meth)acrylate may be present in an amount of about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %.

The cyclic (meth)acrylate having a glass transition temperature of about 80° C. or less in a homopolymer phase can improve peel strength of the adhesive film. The adhesive film includes the alkylene glycol group-containing (meth) acrylate and the cyclic (meth)acrylate having a glass transition temperature of about 80° C. or less in a homopolymer phase in the (meth)acrylic copolymer having an alkylene glycol group and a cyclic functional group, thereby providing good foldability and good peel strength at low temperature upon repeated folding.

An adhesive film including a non-cyclic (meth)acrylate having a glass transition temperature of about 80° C. or less in a homopolymer phase can have a problem with sufficient improvement in peel strength or stability over time in use of an acid. The adhesive film including a cyclic (meth)acrylate having a glass transition temperature of greater than about 80° C. in a homopolymer phase can have a problem with flexural reliability at low temperature.

In an embodiment, the cyclic (meth)acrylate having a glass transition temperature of about 80° C. or less in a homopolymer phase has a glass transition temperature of about −20° C. to about 80° C., and, in an embodiment, about −10° C. to about 70° C., in the homopolymer phase. Within this range, the adhesive film can exhibit good properties in terms of both peel strength and flexural strength.

The cyclic (meth)acrylate having a glass transition temperature of about 80° C. or less in a homopolymer phase may include at least one selected from the group of tetrahydrofurfuryl (meth)acrylate, cyclohexyl (meth)acrylate, and tri methylcyclohexyl (meth)acrylate including 3,3,5-trimethylcyclohexyl (meth)acrylate, without being limited thereto. In an embodiment, the cyclic (meth)acrylate having a glass transition temperature of about 80° C. or less in a homopolymer phase includes at least one selected from the group of tetrahydrofurfuryl acrylate, cyclohexyl acrylate, and 3,3,5-trimethylcyclohexyl acrylate.

In an embodiment, the cyclic (meth)acrylate having a glass transition temperature of about 80° C. or less in a homopolymer phase may be present in an amount of about 5 wt % to about 40 wt %, and, in an embodiment, about 5 wt % to about 30 wt %, and, in an embodiment, about 10 wt % to about 25 wt %, in the monomer mixture. Within this range, the adhesive film can have good foldability upon repeated folding at low temperature. For example, cyclic (meth)acrylate having a glass transition temperature of about 80° C. or less in a homopolymer phase may be present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %.

In an embodiment, the monomer mixture for the (meth) acrylic copolymer having an alkylene glycol group and a cyclic functional group may further include a copolymerizable monomer in addition to the hydroxyl group-containing (meth)acrylate, the alkyl group-containing (meth)acrylate, the alkylene glycol group-containing (meth)acrylate, and the cyclic (meth)acrylate having a glass transition temperature of about 80° C. or less in a homopolymer phase. The copolymerizable monomer included in the (meth)acrylic copolymer can provide additional effects to the adhesive film. The copolymerizable monomer is a different monomer from the aforementioned monomers and may include at least one selected from the group of an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing monomer.

The amine group-containing monomer may be an amine group-containing acrylic monomer, such as any of monomethylaminoethyl acrylate, monoethylaminoethyl acrylate, monomethylaminopropyl acrylate, monoethylaminopropyl acrylate, dimethylaminoethyl acrylate, diethylaminoethyl acrylate, N-tert-butylaminoethyl acrylate, and acryloxyethyltrimethylammonium chloride, without being limited thereto.

The alkoxy group-containing monomer may include any of 2-methoxyethyl acrylate, 2-methoxypropyl acrylate, 2-ethoxypropyl acrylate, 2-butoxypropyl acrylate, 2-methoxypentyl acrylate, 2-ethoxypentyl acrylate, 2-butoxyhexyl acrylate, 3-methoxypentyl acrylate, 3-ethoxypentyl acrylate, and 3-butoxyhexyl acrylate, without being limited thereto.

The phosphoric acid group-containing monomer may be a phosphoric acid group-containing acrylic monomer, such as any of 2-methcryloyloxyethyldiphenylphosphate acrylate, trimethcryloyloxyethylphosphate acrylate, and triacryloyloxyethylphosphate acrylate, without being limited thereto.

The sulfonic acid group-containing monomer may be a sulfonic acid group-containing acrylic monomer, such as any of sulfopropyl acrylate sodium, 2-sulfoethyl acrylate sodium, and 2-acrylamido-2-methylpropane sulfonic acid sodium, without being limited thereto.

The phenyl group-containing monomer may be a phenyl group-containing acrylic vinyl monomer, such as any of p-tert-butylphenyl acrylate, o-biphenyl acrylate, and phenoxyethyl acrylate, without being limited thereto.

The silane group-containing monomer may be a silane group-containing acrylic vinyl monomer, such as any of 2-acetoacetoxyethyl acrylate, vinyltrimethoxysilane, vinyltriethoxysilane, vinyl tris(2-methoxyethyl)silane, vinyltriacetoxysilane, and acryloyloxypropyltrimethoxysilane, without being limited thereto.

The carboxylic acid group-containing monomer may include any of acrylic acid, 2-carboxyethyl acrylate, 3-carboxypropyl acrylate, 4-carboxybutyl acrylate, itaconic acid, crotonic acid, maleic acid, fumaric acid, and maleic anhydride, without being limited thereto.

The amide group-containing monomer may include any of acrylamide, N-methylacrylamide, N-methylolacrylamide, N-methoxymethylacrylamide, N,N-methylenebisacrylamide, N-hydroxyethylacrylamide, and N,N-diethylacrylamide, without being limited thereto.

In an embodiment, the copolymerizable monomer may be present in an amount of about 30 wt % or less, and, in an embodiment, about 0 wt % to about 30 wt %, in the monomer mixture. The copolymerizable monomer may be used to adjust adhesive strength with respect to an adherend and to have optical properties. For example, the copolymerizable monomer may be present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

The adhesive composition may further include an initiator. The initiator serves to form an adhesive film by curing the adhesive composition or to form the (meth)acrylic copolymer having an alkylene glycol group and a cyclic functional group through polymerization of the monomer mixture in the adhesive composition.

In an embodiment, the initiator may include at least one selected from the group of a photopolymerization initiator and a thermal polymerization initiator.

The photopolymerization initiator may be selected from any initiators so long as the initiator can induce polymerization of a radical polymerizable compound during curing through light irradiation. For example, the photopolymerization initiator may include any of benzoin, hydroxy ketone, amino ketone, phosphine oxide photoinitiators, and the like. In an embodiment, the photopolymerization initiator may include any of benzoin, benzoin methyl ether, benzoin ethyl ether, benzoin isopropyl ether, benzoin n-butyl ether, benzoin isobutyl ether, acetophenone compounds such as 2,2-dimethoxy-2-phenylacetophenone, 2,2'-diethoxy acetophenone, 2,2'-dibutoxy acetophenone, 2-hydroxy-2-methylpropiophenone, p-t-butyl trichloroacetophenone, p-t-butyl dichloroacetophenone, 4-chloroacetophenone, 2,2'-dichloro-4-phenoxyacetophenone, dimethylaminoacetophenone, 2,2-dimethoxy-2-phenylacetophenone, and 2,2-diethoxy-2-phenylacetophenone, 2-hydroxy-2-methyl-1-phenylpropan-1-one, 2-benzyl-2-dimethyl amino-1-(4-morpholinophenyl)-butane-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto.

The thermal polymerization initiator may be selected from any typical initiators, for example, azo, peroxide, and redox compounds. Examples of the azo compound may include 2,2-azobis(2-methylbutyronitrile), 2,2-trilazobis(isobutyronitrile), 2,2-trilazobis(2,4-dimethylvaleronitrile), 2,2-nitazobis-2-hydroxymethylpropionitrile, dimethyl-2,2-methylazobis(2-methylpropionate), and 2,2-pioazobis(4-methoxy-2,4-dimethylvaleronitrile), without being limited thereto. Examples of the peroxide compound may include:

inorganic peroxides, such as potassium perchlorate, ammonium persulfate, and hydrogen peroxide; and organic peroxides, such as diacyl peroxide, peroxydicarbonate, peroxyester, tetramethylbutyl peroxyneodecanoate, bis(4-butylcyclohexyl)peroxydicarbonate, di(2-ethylhexyl) peroxycarbonate, butylperoxy neodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide, without being limited thereto. Examples of the redox compound may include mixtures of a peroxide compound and a reductant, without being limited thereto.

In an embodiment, the initiator may be present in an amount of about 0.0001 parts by weight to about 5 parts by weight, and, in an embodiment, about 0.001 parts by weight to about 3 parts by weight, and, in an embodiment, about 0.001 parts by weight to about 1 part by weight, relative to 100 parts by weight of the monomer mixture or the (meth) acrylic copolymer having an alkylene glycol group and a cyclic functional group. Within this range, the initiator allows complete curing of the adhesive composition, can prevent or substantially prevent deterioration in transmittance of the adhesive film due to residual initiator, can reduce bubble generation, and can exhibit good reactivity. For example, the initiator may be present in an amount of about 0.0001, 0.0005, 0.001, 0.005, 0.01, 0.05, 0.1, 0.5, 1, 2, 3, 4, or 5 parts by weight.

The adhesive composition may further include a crosslinking agent. The crosslinking agent can improve mechanical strength of the adhesive film through improvement in crosslinking degree of the adhesive composition.

The crosslinking agent may include a polyfunctional (meth)acrylate capable of being cured by actinic radiation. For example, the crosslinking agent may include any of bifunctional (meth)acrylates, such as any of 1,4-butanediol di(meth)acrylate, 1,6-hexanediol di(meth)acrylate, neopentyl glycol di(meth)acrylate, polyethyleneglycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and 9,9-bis[4-(2-acryloyloxyethoxy)phenyl]fluorine; trifunctional acrylates, such as any of trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethyl isocyanurate; tetrafunctional acrylates, such as any of diglycerin tetra(meth)acrylate and pentaerythritol tetra(meth)acrylate; pentafunctional acrylates, such as any of dipentaerythritol penta(meth)acrylate; and hexafunctional acrylates, such as any of dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto.

In an embodiment, the initiator may be present in an amount of about 0.001 parts by weight to about 5 parts by weight, and, in an embodiment, about 0.003 parts by weight to about 3 parts by weight, and, in an embodiment, about 0.005 parts by weight to about 1 part by weight, relative to 100 parts by weight of the monomer mixture or the (meth)acrylic copolymer having an alkylene glycol group and a cyclic functional group. Within this range, the adhesive film can secure good peel strength and improved reliability. For example, the initiator may be present in an amount of about 0.001, 0.005, 0.01, 0.05, 0.1, 0.5, 1, 2, 3, 4, or 5 parts by weight.

The adhesive composition may further include additives. The additives may be selected from typical additives for adhesive compositions well-known in the art. For example, the additives may include at least one selected from the group of pigments, UV absorbents, leveling agents, and antistatic agents, without being limited thereto.

In an embodiment, the adhesive film may have a peel strength of about 700 gf/in or more at 25° C., and, in an embodiment, about 900 gf/in or more, and, in an embodiment, about 900 gf/in to about 3,000 gf/in. Within this range, the adhesive film can have good durability. Herein, "peel strength" refers to T-peel strength. T-peel strength may be measured by the method in examples described below.

In an embodiment, the adhesive film may have a modulus of about 100 kPa or less at −20° C. Within this range, the adhesive film has good flexibility at low temperature, thereby providing good flexural reliability at low temperature. In an embodiment, the adhesive film preferably has a modulus of about 50 kPa to about 100 kPa at −20° C., and, in an embodiment, about 55 kPa to about 100 kPa, and, in an embodiment, about 60 kPa to about 100 kPa. If the adhesive film has too low of a modulus at low temperature, the adhesive film has too low of a modulus at room temperature/high temperature, thereby causing a problem with recovery performance.

In an embodiment, the adhesive film may have a recovery rate of about 40% or more, and, in an embodiment, about 55% to about 80%, as measured after 1 cycle and defined by the following Equation 5, and a recovery rate of about 20% or more, and, in an embodiment, about 25% to about 40%, as measured after 1,000 cycles of foldability testing and defined by Equation 5. Within this range, it is possible to secure stable repetitive folding reliability.

$$\text{Recovery rate} = (1 - (\gamma_2/\gamma_1)) \times 100,$$ [Equation 5]

where $\gamma_1$ is a value defined by Equation 1, and $\gamma_2$ is a value defined by Equation 2.

In an embodiment, the adhesive film may have a glass transition temperature (Tg) of −100° C. to −10° C., and, in an embodiment, −70° C. to −35° C. Within this range, the adhesive film can have improved folding reliability, not only at low temperature, but also at high temperature. In an embodiment, the adhesive film has a glass transition temperature of about −70° C. to about −45° C. Within this range, the adhesive film can have improved folding reliability, not only at low temperature, but also at high temperature, and can relieve stress upon folding in the tensile direction, thereby securing good foldability.

In an embodiment, the adhesive film may have a haze value of about 2% or less, and, in an embodiment, about 0.1% to about 1%, and a total light transmittance of about 90% or more, and, in an embodiment, about 95% to about 99%, in the visible range (for example, in a wavelength range of 380 nm to 780 nm). Within this range, the adhesive film has good optical transparency and is applicable to an optical display.

In an embodiment, the adhesive film may have a thickness of 10 μm to 300 μm, and, in an embodiment, 12 μm to 175 μm. Within this thickness range, the adhesive film is applicable to an optical display.

In an embodiment, the adhesive composition may be prepared through partial polymerization of the monomer mixture for the (meth)acrylic copolymer having an alkylene glycol group and a cyclic functional group with the initiator, followed by adding an additional initiator. The adhesive composition may further include the crosslinking agent and the additives described above. In another embodiment, the adhesive composition may be prepared through partial polymerization of a mixture including the monomer mixture for the (meth)acrylic copolymer having an alkylene glycol group and a cyclic functional group and the initiator, followed by adding an additional initiator. The crosslinking agent and the additives described above may be further added to the mixture. Partial polymerization may include solution polymerization, suspension polymerization, photopolymerization, bulk polymerization, or emulsion polymerization. In an embodiment, solution polymerization may be performed at about 50° C. to about 100° C. by adding an initiator to the monomer mixture. The initiator may include a photopolymerization initiator, such as an acetophenone compound including 2,2-dimethoxy-2-phenylacetophenone, 1-hydroxycyclohexylphenylketone, and the like, without being limited thereto. In an embodiment, partial polymerization may be performed to achieve a viscosity of about 300 cP to about 50,000 cP at 25° C., and, in an embodiment, about 500 cP to about 9,000 cP.

The adhesive film may be produced by a typical method. For example, the adhesive film may be produced by coating the adhesive composition onto a release film, followed by curing. In an embodiment, curing may be performed under a low-pressure lamp at a wavelength of 300 nm to 400 nm and a dose of about 400 mJ/cm² to about 3,000 mJ/cm² in an oxygen-free state.

Next, an adhesive film according to another embodiment of the present invention will be described.

The adhesive film according to another embodiment satisfies both Equation 3 and Equation 4 and is formed of an adhesive composition including a (meth)acrylic copolymer having an alkylene glycol group and a cyclic functional group and organic nanoparticles. Here, the (meth)acrylic copolymer having an alkylene glycol group and a cyclic functional group may be formed of a monomer mixture including a hydroxyl group-containing (meth)acrylate, an alkyl group-containing (meth)acrylate, an alkylene glycol group-containing (meth)acrylate, and a cyclic (meth)acrylate having a glass transition temperature of about 80° C. or less in a homopolymer phase. The adhesive film according to this embodiment may be substantially the same as the adhesive film according to the above-described embodiment except for the presence of the organic nanoparticles.

The organic nanoparticles can increase the modulus of the adhesive film at high temperature and can further improve reliability of the adhesive film at high temperature by preventing or substantially preventing delamination, slight lifting, and/or bubble generation at high temperature. The organic nanoparticles have a high glass transition temperature, thereby improving the modulus of the adhesive film at high temperature.

In an embodiment, the organic nanoparticles may be optionally present in an amount of about 20 wt % or less, and, in an embodiment, about 0.5 wt % to about 20 wt %, about 0.5 wt % to about 12 wt %, or about 0.5 wt % to about 8 wt %, based on the total amount of the monomer mixture for the (meth)acrylic copolymer having an alkylene glycol group and a cyclic functional group and the organic nanoparticles. Within this range, the organic nanoparticles can secure good properties in terms of modulus of the adhesive film at high temperature, foldability of the adhesive film at room temperature and high temperature, and viscoelasticity of the adhesive film at low temperature and/or room temperature.

In an embodiment, the organic nanoparticles may have an average particle diameter of about 10 nm to about 400 nm, and, in an embodiment, about 10 nm to about 300 nm, and, in an embodiment, about 30 nm to about 280 nm, and, in an embodiment, about 50 nm to about 280 nm. Within this range of average particle diameter, the organic nanoparticles do not affect foldability of the adhesive film and can secure good transparency of the adhesive film by securing a total light transmittance of about 90% or more in the visible range.

In an embodiment, a difference in index of refraction between the organic nanoparticles and the (meth)acrylic copolymer having an alkylene glycol group and a cyclic functional group may be about 0.1 or less, and, in an embodiment, about 0 to about 0.05, and, in an embodiment, about 0 to about 0.02. Within this range, the adhesive film can exhibit good transparency. In an embodiment, the organic nanoparticles may have an index of refraction of about 1.35 to about 1.70, and, in an embodiment, about 1.40 to about 1.60. Within this range, the adhesive film can exhibit good transparency.

The organic nanoparticles may have a core-shell structure or a simple structure such as bead type nanoparticles, without being limited thereto. In an embodiment, the organic nanoparticles may have a core-shell structure, in which the core and the shell satisfy the following Equation 6. That is, the organic nanoparticles may include nanoparticles in which the core and the shell are formed of organic materials. With the organic nanoparticles having the core-shell structure, the adhesive film can exhibit good foldability and balance between elasticity and flexibility.

$$Tg(c) < Tg(s),$$ [Equation 6]

where Tg(c) is the glass transition temperature (unit: ° C.) of the core, and Tg(s) is the glass transition temperature (unit: ° C.) of the shell.

Herein, the term "shell" means an outermost layer of the organic nanoparticle. The core may be a spherical particle. In some embodiments, the core may include an additional layer surrounding the spherical particle so long as the core has a glass transition temperature satisfying the above equation.

In an embodiment, the core may have a glass transition temperature of about −150° C. to about 10° C., and, in an embodiment, about −150° C. to about −5° C., and, in an embodiment, about −150° C. to about −20° C. Within this range, the adhesive film can have good viscoelasticity at low temperature and/or at room temperature. In an embodiment, the core may include at least one selected from the group of poly(alkyl acrylate), polysiloxane, and polybutadiene each having a glass transition temperature within this range.

The poly(alkyl acrylate) may include at least one selected from the group of poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), and poly(ethylhexyl methacrylate), without being limited thereto.

The polysiloxane may be, for example, an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. In an embodiment, the crosslinked organosiloxane (co)polymer may include any of crosslinked dimethylsiloxane, methylphenylsiloxane, diphenylsiloxane, and mixtures thereof. In an embodiment, with a copolymer of two or more organosiloxanes, the nanoparticles may have an index of refraction of about 1.41 to about 1.50.

A crosslinked state of the organosiloxane (co)polymer may be determined based on the degree of dissolution in various organic solvents. As the degree of crosslinking of the organosiloxane (co)polymer increases, the degree of dissolution of the organosiloxane (co)polymer is reduced. A solvent for determination of the crosslinked state may include any of acetone, toluene, and the like. In an embodiment, the organosiloxane (co)polymer may have a moiety which is not dissolved in acetone or toluene. In an embodiment, the organosiloxane copolymer may include about 30% or more of insolubles in toluene.

The organosiloxane (co)polymer may further include an alkyl acrylate crosslinked polymer. The alkyl acrylate crosslinked polymer may include any of methyl acrylate, ethyl acrylate, n-butyl acrylate, 2-ethylhexyl acrylate, and the like. For example, the alkyl acrylate crosslinked polymer may be n-butyl acrylate or 2-ethylhexyl acrylate having a low glass transition temperature.

In an embodiment, the shell may have a glass transition temperature of about 15° C. to about 150° C., and, in an embodiment, about 35° C. to about 150° C., and, in an embodiment, about 50° C. to about 140° C. Within this range, the organic nanoparticles can exhibit good dispersion in the acrylic copolymer. The shell may include poly(alkyl methacrylate) having a glass transition temperature within this range. For example, the shell may include at least one selected from the group of poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In an embodiment, in the organic nanoparticles, the core may be present in an amount of about 30 wt % to about 99 wt %, and, in an embodiment, about 40 wt % to about 95 wt %, and, in an embodiment, about 50 wt % to about 90 wt %. Within this range, the adhesive film can exhibit good foldability in a broad temperature range. In an embodiment, in the organic nanoparticles, the shell may be present in an amount of about 1 wt % to about 70 wt %, and, in an embodiment, about 5 wt % to about 60 wt %, and, in an embodiment, about 10 wt % to about 50 wt %. Within this range, the adhesive film can exhibit good foldability in a broad temperature range.

In an embodiment, the organic nanoparticles may be present in an amount of about 0.1 wt % to about 20 wt %, and, in an embodiment, about 0.5 wt % to about 12 wt %, and, in an embodiment, about 0.5 wt % to about 8 wt %, in the adhesive film. Within this range, the organic nanoparticles can secure good properties in terms of modulus of the adhesive film at high temperature, foldability of the adhesive film at room temperature and high temperature, and viscoelasticity of the adhesive film at low temperature and/or room temperature. For example, the organic nanoparticles may be present in an amount of about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

In an embodiment, the adhesive film including the organic nanoparticles may be formed of an adhesive composition including about 10 wt % to about 40 wt % of the hydroxyl group-containing (meth)acrylate, about 10 wt % to about 75 wt % of the alkyl group-containing (meth)acrylate, about 10 wt % to about 60 wt % of the alkylene glycol group-containing (meth)acrylate, about 5 wt % to about 40 wt % of the cyclic (meth)acrylate having a glass transition temperature of about 80° C. or less in a homopolymer phase, and about 0.1 wt % to about 20 wt % of the organic nanoparticles, based on the total amount of the monomer mixture for the (meth)acrylic copolymer having an alkylene glycol group and a cyclic functional group and the organic nanoparticles.

The organic nanoparticles may be prepared by typical emulsion polymerization, suspension polymerization, or solution polymerization.

An optical member according to an embodiment of the invention includes an optical film and an adhesive film formed on at least one surface of the optical film, wherein the adhesive film includes the adhesive film according to an embodiment of the present invention. Accordingly, the optical member exhibits good bending properties and/or good foldability and, thus, can be used in a flexible display.

In an embodiment, the optical film provides optical functions, for example, polarization, optical compensation, display quality improvement, and/or conductivity, to a display. Examples of the optical film may include a window film, a window, a polarizing plate, a color filter, a retardation film, an elliptical polarizing film, a reflective polarizing film, an anti-reflection film, a compensation film, a brightness improving film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like. These optical films may be easily manufactured by a person having ordinary knowledge in the art.

For example, a touch pad may be attached to a window film or an optical film via the adhesive film, thereby forming a touch panel. In an embodiment, the adhesive film may be applied to a typical polarizing film.

In another embodiment, the optical film is an optically clear film and an optical member including the optical film and the adhesive film may act as a support layer for a display element. For example, the display element may include a window film or the like. The window film may include the optical member and a window coating layer (for example, a silicone coating layer) formed on the optical member. In an embodiment, the optical film may have a total light transmittance of 90% or more in the visible range and may be formed of at least one resin selected from the group of cellulose resins, such as triacetylcellulose, polyester resins, such as polyethylene terephthalate, polyethylene naphthalate, polybutylene terephthalate, and polybutylene naphthalate, polycarbonate resins, polyimide resins, polystyrene resins, polyacrylate resins, such as poly(methyl methacrylate), cyclic olefin polymer resins, acrylic resins, and polyamide resins. In an embodiment, the optical film may have a thickness of about 10 μm to about 100 μm, and, in an embodiment, about 20 μm to about 75 μm, and, in an embodiment, about 30 μm to about 50 μm. Within this range, the optical member may be used as a support layer for a display element.

In an embodiment, the optical member may be a two-layer optical film laminate that includes an optical film and the adhesive film formed on one surface of the optical film. In another embodiment, the optical member may be a three- or more layer film laminate that includes at least two optical films attached to each other via the adhesive film according to the present invention.

In an embodiment, the optical member may be a three-layer film laminate that includes a first optical film, a second optical film, and an adhesive film interposed between the first optical film and the second optical film to attach the first optical film to the second optical film, wherein the adhesive film is the adhesive film according to the present invention. Each of the first optical film and the second optical film may be formed of at least one resin selected from the group of a polyethylene terephthalate resin, a polycarbonate resin, a polyimide resin, a polyacrylate resin, a cyclic olefin polymer resin, and an acrylic resin. In an embodiment, each of the first optical film and the second optical film may have a thickness of about 10 μm to about 100 μm, and, in an embodiment, about 20 μm to about 75 μm, and, in an embodiment, about 30 μm to about 50 μm, and the adhesive film may have a thickness of about 10 μm to about 100 μm. Within this thickness range, the optical member can maximize or increase impact resistance while maintaining good foldability. In an embodiment, the first optical film and the second optical film may have different thicknesses and may be formed of different materials.

An optical display according to an embodiment of the present invention includes the adhesive film according to the present invention. The optical display may include any of an organic light emitting display, a liquid crystal display, and the like. In an embodiment, the optical display may include a flexible display. In other embodiments, the optical display may include a non-flexible display.

Next, the present invention will be described in further detail with reference to some examples. However, it should be noted that these examples are provided for illustration only and should not be construed in any way as limiting the present invention.

EXAMPLE 1

Organic nanoparticles were prepared by emulsion polymerization. The core was formed of poly(butyl acrylate), and the shell was formed of poly(methyl methacrylate). In the organic nanoparticles, the shell was present in an amount of 35 wt %, and the core was present in an amount of 65 wt %. The organic nanoparticles had an average particle diameter of 100 nm and an index of refraction of 1.48.

100 parts by weight of a mixture of the prepared organic nanoparticles and a monomer mixture, as listed in Table 1, and 0.005 parts by weight of an initiator (Irgacure 651) were sufficiently mixed in a reactor. After replacing dissolved oxygen in the reactor with nitrogen gas, the monomer mixture was subjected to partial polymerization through irradiation with UV light for several minutes using a low-pressure mercury lamp, thereby preparing a viscous liquid having a viscosity of 5,000 cP at 25° C. 0.3 parts by weight of an initiator (Irgacure 651) was added to the viscous liquid and mixed therewith, thereby preparing an adhesive composition.

The adhesive composition was coated onto a polyethylene terephthalate (PET) release film and irradiated with UV light at a dose of 2,000 mJ/cm$^2$, thereby preparing an adhesive sheet in which an adhesive film is stacked on the PET film.

EXAMPLES 2 TO 8

Each adhesive sheet of an adhesive film and a PET film was fabricated in the same manner as in Example 1 except that the components of the adhesive composition were changed as listed in Table 1.

COMPARATIVE EXAMPLES 1 TO 4

Each adhesive sheet of an adhesive film and a PET film was fabricated in the same manner as in Example 1 except that the components of the adhesive composition were changed as listed in Table 1.

Figure 4:
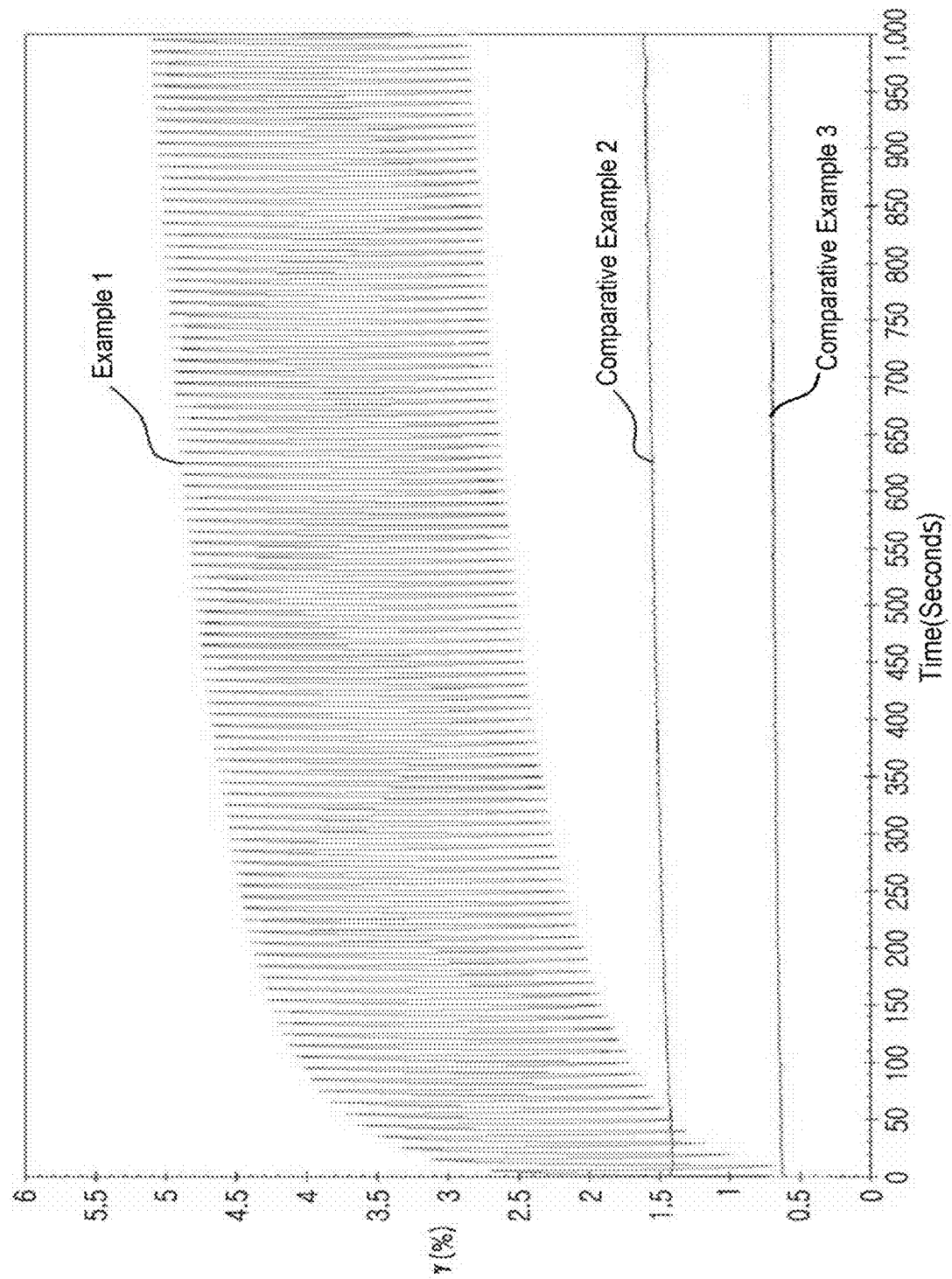
FIG. 4 is a graph depicting measurement results of adhesive films of an Example according to the present invention and some Comparative Examples after 100 cycles of foldability testing.
Figure 5:
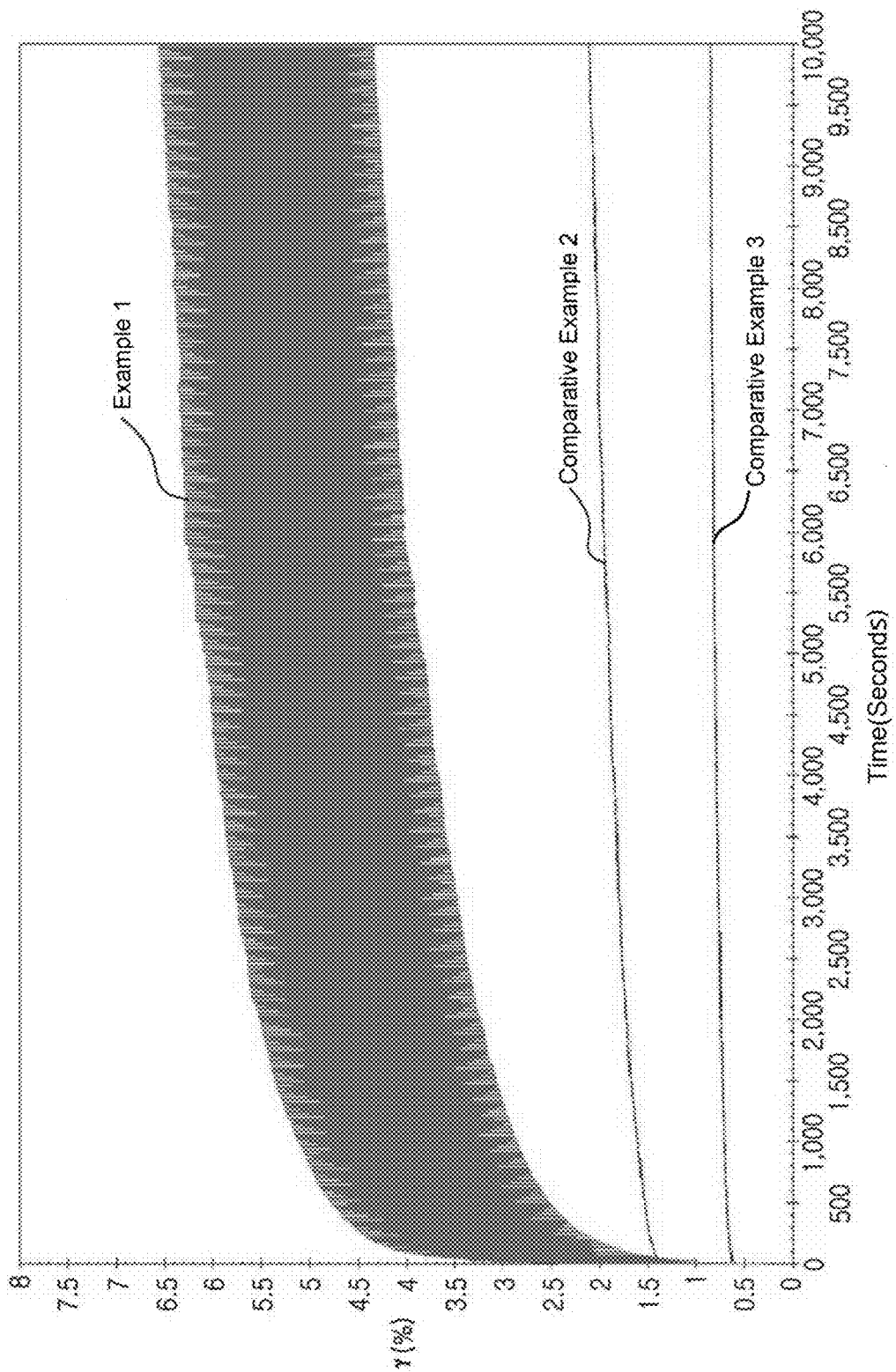
FIG. 5 is a graph depicting measurement results of adhesive films of an Example according to the present invention and some Comparative Examples after 1000 cycles.

The adhesive films were removed from the PET films of the adhesive sheets of the Examples and Comparative Examples and were evaluated as to the following properties as listed in Table 1, and evaluation results are shown in Table 1, FIG. 3, FIG. 4, and FIG. 5.

(1) Peel strength (unit: gf/in): An adhesive film having a size of 100 mm×25 mm×100 μm (length×width×thickness) was obtained by releasing the PET film from each of the adhesive sheets prepared in the Examples and Comparative Examples. One surface of the PET film having a size of 150 mm×25 mm×75 μm (length×width×thickness) was subjected to corona treatment twice (total dose: 156) under plasma discharge at a dose of 78 using a corona treatment device. The corona-treated surfaces of the PET films were stacked on both surfaces of the adhesive film, thereby preparing a specimen, as shown in FIG. 2A. The specimen was autoclaved under conditions of 3.5 bar and 50° C. for about 1,000 seconds and secured to a TA.XT-Plus texture analyzer (Stable Micro Systems Co., Ltd.). Referring to FIG. 2B, with one of the PET films secured to the TA.XT-Plus Texture Analyzer at 25° C., T-peel strength was measured by pulling the other PET films at 50 mm/min.

(2) Modulus (unit: kPa): Viscoelasticity was measured under auto-strain conditions at a shear rate of 1 rad/sec and a strain of 1% using a rheometer (MCR-501, Anton Paar Co., Ltd.) as a dynamic viscoelasticity instrument. Plural adhesive films prepared in each of the Examples and Comparative Examples were stacked to a thickness of 400 μm, followed by punching the stack using an 8 mm diameter punching machine, thereby preparing a specimen. With a normal force of 3N applied to the specimen using an 8 mm jig, modulus was measured at −20° C. while increasing temperature from −60° C. to 90° C. at a rate of 5° C./min.

(3) γ1 and γ2: An adhesive film having a size of 100 mm×25 mm×50 μm (length×width×thickness) was obtained by removing the PET film from each of the adhesive sheets prepared in the Examples and Comparative Examples. Plural adhesive films prepared in each of the Examples and Comparative Examples were stacked, followed by punching the stack using an 8 mm diameter punching machine, thereby preparing a cylindrical specimen (thickness: 400 μm, diameter: 8 mm) having upper and lower surfaces. The prepared cylindrical specimen was mounted on a rheometer (MCR-501, Anton Paar Co., Ltd.) used as a dynamic viscoelasticity instrument such that the upper and lower surfaces of the specimen were secured to upper and lower jigs of the rheometer. By moving the upper jig secured to the upper surface of the cylindrical specimen under the condition that the lower jig secured to the lower surface of the cylindrical specimen was fixed, an operation of applying a force consisting of a shear stress of 2,000 Pa and a normal force of 1 N to the cylindrical specimen at −20° C. in the clockwise direction for 5 seconds and then completely removing the force from the cylindrical specimen for 5 seconds was performed once, 10 times, 100 times, and 1,000 times (1 cycle, 10 cycles, 100 cycles, and 1,000 cycles of foldability testing). Upon application of the force in each cycle of foldability testing, γ1 (unit:%) may be calculated according to the following Equation 1 based on the graph obtained from the dynamic viscoelasticity instrument.

$$\gamma 1 = A/B \times 100, \quad \text{[Equation 1]}$$

where A is a movement distance (unit: μm) of one point of the cylindrical specimen upon application of the force to the specimen for 5 seconds, and B is an initial thickness of the cylindrical specimen (unit: μm).

Upon complete removal of the force for 5 seconds after application of the force in each cycle of foldability testing, γ2 (unit: %) may be calculated according to the following Equation 2 based on the graph obtained from the dynamic viscoelasticity instrument.

$$\gamma 2 = C/B \times 100, \quad \text{[Equation 2]}$$

where C is a movement distance (unit: μm) of one point of the cylindrical specimen after 1 cycle, and B is an initial thickness of the cylindrical specimen (unit: μm).

γ1 and γ2 were obtained by performing the cycle of foldability testing once, 10 times, 100 times, and 1,000 times (1 cycle, 10 cycles, 100 cycles, and 1,000 cycles).

The value of the following Equation 4 was obtained based on γ1 and γ2.

$$|\gamma 2 - \gamma 1|_{[10]}/|\gamma 2 - \gamma 1|_{[1000]} \times 100 = \text{about 80\% to about 120\%}, \quad \text{[Equation 4]}$$

where $|\gamma 2 - \gamma 1|_{[10]}$ is an absolute value (unit: %) of a difference between γ2 and γ1 after 10 cycles of foldability testing, and $|\gamma 2 - \gamma 1|_{[1000]}$ is an absolute value (unit: %) of a difference between γ2 and γ1 after 1,000 cycles of foldability testing.

(4) Recovery rate (unit: %): γ1 and γ2 were obtained by performing the cycle of foldability testing once and 1,000 times (1 cycle and 1,000 cycles), and the recovery rate was calculated according to the following Equation 5.

$$\text{Recovery rate} = (1 - (\gamma 2/\gamma 1)) \times 100. \quad \text{[Equation 5]}$$

(5) Flexural reliability 1: A module sample was fabricated by sequentially stacking a window film, an adhesive film, a polarizer, an adhesive film, and an OLED panel. The window film, the adhesive film, the polarizer, the adhesive film, and the OLED panel used in fabrication of the module sample were as follows.

Window film: A PET film (thickness: 100 μm, Cosmoshine TA015, Toyobo Co., Ltd.) was used.

Adhesive film: The adhesive films (thickness: 50 μm) prepared in the Examples and Comparative Examples were used.

Polarizer: A PVA resin dyed with iodine was used. An 80 μm thick polyvinyl alcohol film (degree of saponification: 99.5, degree of polymerization: 2,000) was dipped and dyed in a 0.3% iodine solution and stretched to a length of 5.0 times an initial length thereof in the MD. Then, the stretched polyvinyl alcohol film was dipped in a 3% boric acid solution and a 2% potassium iodide solution for color correction. Then, the polyvinyl alcohol film was dried at 50° C. for 4 minutes, thereby providing a 23 μm thick polarizer.

OLED panel: A PET film (thickness: 100 μm, Cosmoshine TA015, Toyobo Co., Ltd.) was used.

The fabricated module sample was cut into a specimen having a size of 170 mm×110 mm and subjected to 100,000 cycles of folding at −20° C. to evaluate generation of bubbles, cracks, and delamination. The specimen was subjected to the folding test in the longitudinal direction of the specimen and in the direction of the adhesive film such that a bent portion of the specimen had a radius of curvature of 1.5 mm at a folding rate of 30 cycles per minute (here, 1 cycle refers to an operation of folding the specimen to have the radius of curvature, followed by unfolding the adhesive film back to an original state thereof). Generation of no bubbles, cracks, and delamination was evaluated as good and generation of at least one of bubbles, cracks, and delamination was evaluated as poor.

(6) Flexural reliability 2: A module sample was fabricated by the same method as in (5). The sample was evaluated by folding in the same manner as in (5). Here, 1,000 cycles of folding at −20° C. (low temperature folding) and 1,000 cycles of folding at 60° C. and 93% RH (high temperature/humidity folding) were repeated.

TABLE 1

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| 2-EHA | | 49 | 39 | 49 | 39 | 49 | 39 | 19 | 50 | 59 | 49 | 39 | 80 |
| EHDG-AT | | 30 | 30 | 30 | 30 | 30 | 30 | 50 | 30 | 30 | 30 | 30 | 0 |
| 2-HEA | | 10 | 10 | 10 | 10 | 10 | 10 | 10 | 10 | 10 | 10 | 10 | 10 |
| THFA | | 10 | 20 | 0 | 0 | 0 | 0 | 0 | 10 | 0 | 0 | 0 | 10 |
| CHA | | 0 | 0 | 10 | 20 | 0 | 0 | 0 | 0 | 0 | 0 | 0 | 0 |
| TMCHA | | 0 | 0 | 0 | 0 | 10 | 20 | 20 | 0 | 0 | 0 | 0 | 0 |
| ACMO | | 0 | 0 | 0 | 0 | 0 | 0 | 0 | 0 | 0 | 10 | 20 | 0 |
| Organic nanoparticles | | 1 | 1 | 1 | 1 | 1 | 1 | 1 | 0 | 1 | 1 | 1 | 0 |
| Peel strength | | 1230 | 1377 | 1250 | 1412 | 1294 | 1433 | 1078 | 1157 | 425 | 1284 | 1454 | 1490 |
| Modulus | | 72 | 81 | 77 | 86 | 82 | 96 | 78 | 71 | 43 | 153 | 348 | 112 |
| 1 cycle | γ1 | 2.69 | 2.54 | 2.61 | 2.48 | 2.45 | 2.12 | 2.55 | 2.67 | 3.25 | 1.41 | 0.62 | 1.69 |
| | γ2 | 0.70 | 0.75 | 0.72 | 0.81 | 0.77 | 0.91 | 0.62 | 0.83 | 0.97 | 1.41 | 0.62 | 1.61 |
| 10 cycles | γ1 | 4.02 | 3.87 | 3.85 | 3.74 | 3.68 | 3.41 | 3.78 | 4.24 | 4.58 | 1.43 | 0.64 | 1.97 |
| | γ2 | 1.71 | 1.87 | 1.84 | 1.74 | 1.89 | 1.94 | 1.62 | 1.89 | 1.64 | 1.43 | 0.64 | 1.75 |
| 100 cycles | γ1 | 5.11 | 4.88 | 5.09 | 4.69 | 4.50 | 4.26 | 4.53 | 5.34 | 6.14 | 1.61 | 0.71 | 2.12 |
| | γ2 | 2.87 | 2.97 | 2.86 | 2.78 | 2.86 | 3.01 | 2.71 | 2.77 | 2.65 | 1.61 | 0.71 | 1.89 |

TABLE 1-continued

|  |  | Example | | | | | | | | Comparative Example | | | |
| --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 |
| 1000 cycles | $\gamma1$ | 6.61 | 6.46 | 6.51 | 6.39 | 6.24 | 6.05 | 6.29 | 6.73 | 8.13 | 2.11 | 0.85 | 2.35 |
|  | $\gamma2$ | 4.38 | 4.46 | 4.34 | 4.52 | 4.40 | 4.45 | 3.97 | 4.04 | 4.77 | 2.11 | 0.85 | 2.11 |
| Value of Equation 4 |  | 104% | 100% | 93% | 107% | 97% | 92% | 93% | 87% | 88% | 0% | 0% | 92% |
| Recovery rate (1 cycle) |  | 74% | 70% | 72% | 67% | 69% | 57% | 76% | 69% | 70% | 0% | 0% | 5% |
| Recovery rate (1000 cycles) |  | 34% | 31% | 33% | 29% | 29% | 26% | 37% | 40% | 41% | 0% | 0% | 10% |
| Flexural reliability 1 |  | Good | Good | Good | Good | Good | Good | Good | Good | Poor | Poor | Poor | Poor |
| Flexural reliability 2 |  | Good | Good | Good | Good | Good | Good | Good | Good | Poor | Poor | Poor | Poor |

\* 2-EHA: 2-ethylhexyl acrylate (LG Chemical, Tg in homopolymer phase: −64.5° C.)
\* EHDG-AT: 2-ethylhexyl diethylene glycol acrylate (EO 2 mol, Kyoeisha Chemical CO., LTD. Tg in homopolymer phase: −72° C.)
\* 2-HEA: 2-hydroxyethyl acrylate (Osaka Organic Chemical Industry Ltd., Tg in homopolymer phase: −15° C.)
\* THFA: Tetrahydrofurfuryl acrylate (Tokyo Chemical Industry Co., Ltd., Tg in homopolymer phase: −12° C.)
\* CHA: Cyclohexyl acrylate (Tokyo Chemical Industry Co., Ltd., Tg in homopolymer phase: 19° C.)
\* TMCHA: 3,3,5-trimethylcyclohexyl acrylate (Miwon Specialty, Tg in homopolymer phase: 49° C.)
\* ACMO: Acryloylmorpholine (Kkj Chemicals Co., Tg in homopolymer phase: 145° C.)

As shown in Table 1, the adhesive films according to the present invention had good foldability and good peel strength with respect to an adherend not only at low temperature, but also under environment variation conditions from low temperature to high temperature/humidity conditions. Referring to FIG. 3 to FIG. 5, the adhesive films according to the present invention had different $\gamma1$ and $\gamma2$ values than the adhesive films of Comparative Examples 2 and 3.

Conversely, the adhesive film of Comparative Example 1 prepared using an adhesive composition including a (meth)acrylic copolymer having an alkylene glycol group and a cyclic functional group had problems of low peel strength and poor foldability at low temperature. The adhesive films of Comparative Examples 2 to 4 failed to satisfy at least one of Equation 3 and Equation 4 and had poor foldability at low temperature and in environment variation from low temperature to high temperature/humidity conditions.

While some embodiments of the present invention have been described herein, it is to be understood that various modifications, changes, alterations, and equivalent embodiments may be made by those skilled in the art without departing from the spirit and scope of the present invention.

What is claimed is:

1. An adhesive film formed of an adhesive composition comprising a (meth)acrylic copolymer comprising an alkylene glycol group and a cyclic functional group, the adhesive film satisfying the following Equations 3 and 4:

γ1 after 10 cycles of foldability testing=about 2.50% to about 5.00%, [Equation 3]

|γ2−γ1|$_{[10]}$/|γ2−γ1|$_{[1000]}$×100=about 80% to about 120%, [Equation 4]

where |γ2−γ1|$_{[10]}$ is an absolute value (unit: %) of a difference between γ2 and γ1 after 10 cycles of foldability testing, and |γ2−γ1|$_{[1000]}$ is an absolute value (unit: %) of a difference between γ2 and γ1 after 1,000 cycles of foldability testing, wherein each cycle of foldability testing refers to an operation of applying a force consisting of a shear stress of 2,000 Pa and a normal force of 1 N to a cylindrical specimen at −20° C. in a clockwise direction for 5 seconds and completely removing the force from the cylindrical specimen for 5 seconds using an upper jig of a dynamic viscoelasticity instrument, with upper and lower surfaces of the cylindrical specimen secured to the upper jig and a lower jig of the dynamic viscoelasticity instrument, respectively, in which the cylindrical specimen is prepared by stacking the adhesive film in plural layers and punching a stack of the adhesive films to have a circular cross-section having a diameter of 8 mm; γ1 (unit: %) refers to a value calculated by the following Equation 1 upon application of the force to the specimen for 5 seconds; and γ2 refers to a value (unit: %) calculated by the following Equation 2 after 1 cycle of foldability testing:

γ1=A/B×100, [Equation 1]

where A is a movement distance (unit: μm) of one point on the specimen upon application of the force to the specimen for 5 seconds and B is an initial thickness of the specimen (unit: μm), γ2=C/B×100, [Equation 2]

where C is a movement distance (unit: μm) of one point on the specimen after 1 cycle of foldability testing, and B is the initial thickness of the specimen (unit: μm),
wherein the (meth)acrylic copolymer comprising the alkylene glycol group and the cyclic functional group comprises a copolymer of a monomer mixture comprising a hydroxyl group-containing (meth)acrylate, an alkyl group-containing (meth)acrylate, an alkylene glycol group-containing (meth)acrylate, and a cyclic (meth)acrylate having a glass transition temperature of about 80° C. or less in a homopolymer phase,
wherein the cyclic (meth)acrylate having a glass transition temperature of about 80° C. or less in a homopolymer phase is present in an amount of about 10 wt % to about 40 wt % in the monomer mixture, and the cyclic (meth)acrylate having a glass transition temperature of about 80° C. or less in a homopolymer phase comprises at least one of cyclohexyl (meth)acrylate, tetrahydrofurfuryl (meth)acrylate, or 3,3,5-trimethylcyclohexyl (meth)acrylate,
wherein the alkylene glycol group-containing (meth)acrylate is present in an amount of 30 wt % to about 60 wt % in the monomer mixture, wherein the hydroxyl group-containing (meth)acrylate is present in an amount of about 10 wt % to about 40 wt % in the monomer mixture, and wherein the alkylene glycol group-containing (meth)acrylate is greater in amount than the hydroxyl group-containing (meth)acrylate in the monomer mixture.

2. The adhesive film according to claim 1, wherein the cyclic (meth)acrylate having a glass transition temperature of about 80° C. or less in a homopolymer phase has a glass transition temperature of about −20° C. to about 80° C. in a homopolymer phase.

3. The adhesive film according to claim 1, wherein the alkylene glycol group-containing (meth)acrylate comprises an ethylene oxide group (—$CH_2CH_2O$—) or a propylene oxide group (—$CH_2CH_2CH_2O$—).

4. The adhesive film according to claim 1, wherein the alkylene glycol group-containing (meth)acrylate comprises at least one selected from the group consisting of ethylhexyldiethylene glycol (meth)acrylate, ethylhexyltriethylene glycol (meth)acrylate, and octyldiethylene glycol (meth)acrylate.

5. The adhesive film according to claim 1, wherein the monomer mixture comprises about 10 wt % to about 40 wt % of the hydroxyl group-containing (meth)acrylate, about 10 wt % to about 55 wt % of the alkyl group-containing (meth)acrylate, about 30 wt % to about 50 wt % of the alkylene glycol group-containing (meth)acrylate, and about 10 wt % to about 20 wt % of the cyclic (meth)acrylate having a glass transition temperature of about 80° C. or less in a homopolymer phase.

6. The adhesive film according to claim 1, wherein the adhesive film has a peel strength of about 700 gf/in or more at 25° C.

7. The adhesive film according to claim 1, wherein the adhesive film has a modulus of about 100 kPa or less at −20° C.

8. The adhesive film according to claim 1, wherein the adhesive film has a recovery rate of about 40% or more after 1 cycle of foldability testing, as defined by the following Equation 5:

$$\text{Recovery rate}=(1-(\gamma2/\gamma1))\times100, \qquad \text{[Equation 5]}$$

where $\gamma1$ is a value defined by Equation 1, and $\gamma2$ is a value defined by Equation 2.

9. The adhesive film according to claim 1, wherein the adhesive film has a recovery rate of about 20% or more after 1,000 cycles of foldability testing, as defined by the following Equation 5:

$$\text{Recovery rate}=(1-(\gamma2/\gamma1))\times100, \qquad \text{[Equation 5]}$$

wherein $\gamma1$ is a value defined by Equation 1, and $\gamma2$ is a value defined by Equation 2.

10. The adhesive film according to claim 1, further comprising organic nanoparticles.

11. The adhesive film according to claim 10, wherein the organic nanoparticles comprise core-shell nanoparticles.

12. The adhesive film according to claim 11, wherein the organic nanoparticles satisfy the following Equation 6:

$$Tg(c)<Tg(s), \qquad \text{[Equation 6]}$$

where $Tg(c)$ is a glass transition temperature of the core (unit:° C.), and $Tg(s)$ is a glass transition temperature of the shell (unit:° C.).

13. The adhesive film according to claim 10, wherein the adhesive composition comprises about 10 wt % to about 40 wt % of the hydroxyl group-containing (meth)acrylate, about 10 wt % to about 75 wt % of the alkyl group-containing (meth)acrylate, about 30 wt % to about 50 wt % of the alkylene glycol group-containing (meth)acrylate, about 10 wt % to about 20 wt % of the cyclic (meth)acrylate having a glass transition temperature of about 80° C. or less in a homopolymer phase, and about 0.1 wt % to about 20 wt % of the organic nanoparticles, based on a total amount of the monomer mixture for the (meth)acrylic copolymer comprising the alkylene glycol group and the cyclic functional group and the organic nanoparticles.

14. An optical member comprising:
an optical film and an adhesive film on at least one surface of the optical film, the adhesive film comprising the adhesive film according to claim 1.

15. An optical display comprising the optical member according to claim 14.

* * * * *